United States Patent
Yang et al.

(10) Patent No.: US 8,331,426 B2
(45) Date of Patent: Dec. 11, 2012

(54) METHOD, SYSTEM AND APPARATUS FOR IMPROVING THROUGHPUT PERFORMANCE OF SPACE DIVISION MULTIPLE ACCESS SYSTEM

(75) Inventors: Luxi Yang, Shenzhen (CN); Yongming Huang, Shenzhen (CN); Yuanqian Luo, Shenzhen (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 12/815,101

(22) Filed: Jun. 14, 2010

(65) Prior Publication Data

US 2010/0290549 A1 Nov. 18, 2010

Related U.S. Application Data

(63) Continuation of application No. PCT/CN2008/073481, filed on Dec. 12, 2008.

(30) Foreign Application Priority Data

Dec. 14, 2007 (CN) .......................... 2007 1 0302115

(51) Int. Cl.
*H04L 5/16* (2006.01)
(52) U.S. Cl. ........ 375/219; 375/260; 375/262; 375/267; 375/295; 375/340; 375/341; 375/316; 375/265; 375/349
(58) Field of Classification Search .................. 375/219, 375/260, 262, 267, 295, 340, 341, 316, 265, 375/349; 370/203, 204, 205, 208, 209, 210, 370/276; 455/73
See application file for complete search history.

(56) References Cited

U.S. PATENT DOCUMENTS

| 7,684,527 | B2 * | 3/2010 | Yokoyama | .................... 375/347 |
| 2002/0186785 | A1 | 12/2002 | Hoshino et al. | |
| 2004/0184398 | A1 | 9/2004 | Walton et al. | |
| 2005/0037718 | A1 | 2/2005 | Kim et al. | |

FOREIGN PATENT DOCUMENTS

| CN | 1358357 A | 7/2002 |
| CN | 1574685 A | 2/2005 |

(Continued)

OTHER PUBLICATIONS

Chinese Office Action, Chinese Application No. 200710302115.6, Dated: Sep. 2, 2010, 5 pages.

(Continued)

*Primary Examiner* — Dhaval Patel
(74) *Attorney, Agent, or Firm* — Slater & Matsil, L.L.P.

(57) ABSTRACT

A method, a system, and an apparatus for improving throughput performance of an SDMA system are disclosed herein. The method includes BTS receiving feedback information sent by a UE, where the feedback information comprises an ID of a preferred beam of the UE in a pre-coding codebook, information related to a channel vector modulus value, and information about phase difference between a channel vector and the preferred beam of the UE, and the BTS using a set estimation algorithm to estimate sum throughputs supported by a current SDMA system in each sending mode according to the received feedback information and information about space correlation between multiple antennas of the BTS, selecting a maximum sum throughput among the estimated sum throughputs, and using the sending mode corresponding to this sum throughput to send data. The method, system, and apparatus provided herein improve transmitting performance of the SDMA system.

14 Claims, 4 Drawing Sheets

FOREIGN PATENT DOCUMENTS

| CN | 1781275 A | 5/2006 |
|---|---|---|
| JP | 2007-096744 A | 4/2007 |

OTHER PUBLICATIONS

Costa, M., "Writing on Dirty Paper," IEEE Transactions on Information Theory, May 1983, pp. 439-441, vol. IT-29, 29, No. 3, IEEE.

Viswanath, P., et al., "Opportunistic Beamforming Using Dumb Antennas," IEEE Transactions on Information Theory, Jun. 2002, pp. 1277-1294, vol. 48, No. 6, IEEE.

Schubert, M., et al., "Solution of the Multiuser Downlink Beamforming Problem With Individual SINR Constraints," IEEE Transactions of Vehicular Technology, Jan. 2004, pp. 18-28, vol. 53, No. 1, IEEE.

Serbetli, S., et al., "Transceiver Optimization for Multiuser MIMO Systems," IEEE Transactions on Signal Processing, Jan. 2004, pp. 214-226, vol. 52, No. 1, IEEE.

Spencer, Q., et al., "Zero-Forcing Methods for Downlink Spatial Multiplexing in Multiuser MIMO Channels," IEEE Transactions on Signal Processing, Feb. 2004, pp. 461-471, vol. 52, No. 2, IEEE.

Love, D., et al., "Multi-Mode Precoding Using Linear Receivers for Limited Feedback MIMO Systems," IEEE International Conference on Communications, Jun. 20-24, 2004, pp. 448-452, vol. 1, IEEE.

Sharif, M., et al., "On the Capacity of MIMO Broadcast Channels With Partial Side Information," IEEE Transactions on Information Theory, Feb. 2005, pp. 506-522, vol. 51, No. 2, IEEE.

Tarighat, A., et al., "A Multi User Beamforming Scheme for Downlink MIMO Channels Based on Maximizing Signal-to-Leakage Ratios," IEEE International Conference on Acoustics, Speech, and Signal Processing, ICASSP 2005 Proceedings, Mar. 18-23, 2005, pp. iii/1129-iii/1132, vol. 3, IEEE.

Ding, P., et al., "Multiple Antenna Broadcast Channels With Limited Feedback," IEEE International Conference on Acoustics, Speech, and Signal Processing, ICASSP 2006 Proceedings, May 14-19, 2006, pp. iv/25-iv/28, IEEE, Toulouse, France.

Gesbert, D., et al., "Transmit Correlation-aided Scheduling in Multiuser MIMO Networks," IEEE International Conference on Acoustics, Speech, and Signal Processing, ICASSP 2006 Proceedings, May 14-19, 2006, pp. iv/249-iv/252, IEEE, Toulouse, France.

China Unicom, et al., "Joint Proposal for 3GPP2 Physical Layer for FDD Spectra," 3GPP2 TSG-C WG3 Contribution, C30-20060731-040R4, Jul. 31, 2006, 84 pages, Montreal, QC, Canada.

Jindal, N., "MIMO Broadcast Channels With Finite-Rate Feedback," IEEE Transactions on Information Theory, Nov. 2006, pp. 5045-5060, vol. 52, No. 11, IEEE.

Huang, K., et al., "Orthogonal Beamforming for SDMA Downlink With Limited Feedback," IEEE International Conference on Acoustics, Speech, and Signal Processing, ICASSP 2007 Proceedings, Apr. 15-20, 2007, pp. iii/97-iii/100, IEEE, Honolulu, HI, United States.

International Search Report, PCT/CN2008/073481, Date of mailing Mar. 26, 2009, 4 pages.

International Preliminary Report on Patentability, PCT/CN2008/073481, Date of issuance Jun. 15, 2010, 5 pages.

Japanese Office Action, Japanese Application No. 2010-537243, Applicant: Huawei Technologies Co., Ltd., Mailing Date: Nov. 1, 2011, 6 pages.

Tomcik, Jim et al., "MBFDD and MBTDD: Proposed Draft Air Interface Specification," IEEE 802.20 Working Group on Mobile Broadband Wireless Access, http://ieee802.org/20/>, Jan. 6, 2006; 805 pages.

* cited by examiner

| The BTS receives the following information sent by a UE: an ID of a beam preferred by the UE in the precoding codebook, information related to a channel vector modulus value, and information about phase difference between a channel vector and the preferred beam | ← 101 |

↓

| The BTS uses a set estimation algorithm to estimate sum throughputs supported by the current SDMA system in each sending mode according to the feedback information sent by the UE in step 101 and information about space correlation between multiple antennas of the BTS, and selects the best sending mode so that the SDMA system can obtain the maximum sum throughput | ← 102 |

↓

| The BTS determines the corresponding sending mode as well as the beam quantity and the UE corresponding to this sending mode according to the selected maximum sum throughput. Data streams are carried in the determined beam to the UE | ← 103 |

FIG. 1

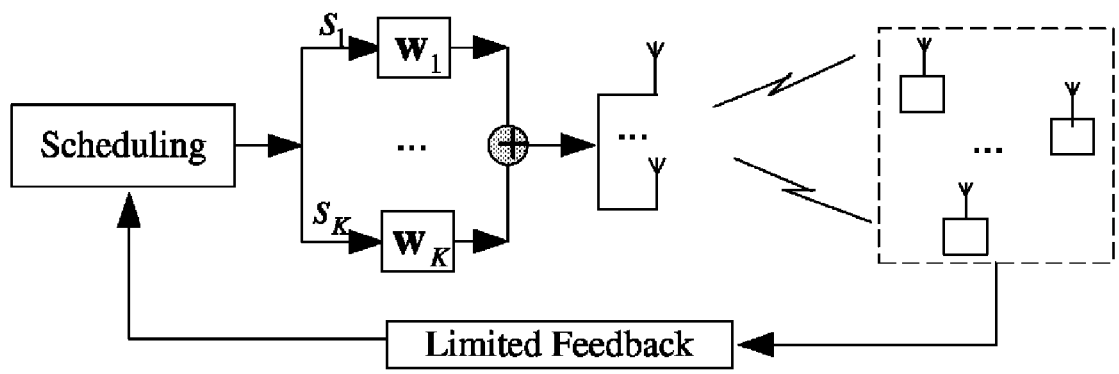

FIG. 2

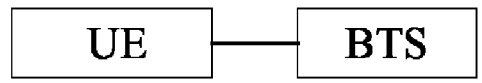

FIG. 3

METHOD, SYSTEM AND APPARATUS FOR IMPROVING THROUGHPUT PERFORMANCE OF SPACE DIVISION MULTIPLE ACCESS SYSTEM

This application is a continuation of co-pending International Application No. PCT/CN2008/073481, filed Dec. 12, 2008, which designated the United States and was not published in English, and which claims priority to Chinese Application No. 200710302115.6, filed Dec. 14, 2007, both of which applications are incorporated herein by reference.

TECHNICAL FIELD

The present invention relates to a Space Division Multiple Access (SDMA) technology, and in particular, to a method, a system, and an apparatus for improving throughput performance of an SDMA system.

BACKGROUND

In a multi-antenna broadcast channel, data may be sent to more than one User Equipment (UE) simultaneously by using space resources, which is known as an SDMA technology. In contrast to the traditional Time Division Multiple Access (TDMA), the SDMA can double the system throughput. Studies show that when data is sent to multiple UEs, space resources can be allocated through Dirty Paper Code (DPC) to accomplish the best performance of the SDMA. However, such a solution is not practical because it is too complicated and does not take on a cause-result relation. Currently in an SDMA system, a common method of allocating space resources is a simpler multi-user pre-coding technology such as Zero Forcing (ZF) multi-user pre-coding technology, Minimum Mean Square Error (MMSE) multi-user pre-coding technology, or multi-user pre-coding technology based on generalized characteristic values and iterative pre-coding technology. Such technologies accomplish high performance at time of allocating space resources. If implemented together with the user scheduling technology, such technologies can achieve multi-user diversity of the broadcast channel. However, if such technologies are used together with the user scheduling technology, the Base Transceiver Station (BTS) in the SDMA system needs to know Channel State Information (CSI) of all UEs precisely beforehand. In the SDMA access system, if the CSI of all UEs are fed back, too much overhead is generated, and the solution is hardly realizable.

Therefore, the prior art puts forward a limited feedback SDMA technology, which comes in two types depending on the content of the feedback information: SCDMA based on channel quantization and SDMA based on a pre-coding version. The SDMA based on channel quantization quantizes the CSI of the UE, and generates a channel quantization codebook which is previously known to the BTS and the UE, thus reducing the quantity of the feedback information. When the requested user quantity is greater than the maximum concurrent user quantity supported by the SDMA, the pre-coding and the user scheduling generally need to be designed jointly. The SDMA based on a pre-coding codebook involves design of a pre-coding codebook or employs a random scheduling technology. The pre-coding codebook may use a random unitary matrix (U-matrix), select multiple UEs with good channel conditions according to the user feedback information, and send data concurrently through the random U-matrix. The SDMA based on a pre-coding codebook is easy to implement, involves little overhead of CSI feedback, and requires the UE to feed back only the identifier (ID) of the preferred beam of the UE and its Signal-Interference-Noise Ratio (SINR) (or the corresponding capacity). With the increase of the user quantity, the theoretic optimality and capacity growth rate can be accomplished. However, in a sparse SDMA access system, namely, in an SDMA access technology with few users, strong interference generally exists between concurrent users which are scheduled through SDMA scheduling based on a pre-coding codebook because the user quantity is low and the pre-coding matrix is generated randomly. Therefore, the enhancement of the performance of the SDMA system is rather limited.

Specifically, the SDMA based on a pre-coding codebook may also use a random U-matrix as a pre-coding codebook. In this case, the SDMA system sends data to the user in the following way. First, the UE prefers a beam ID (the number of columns of the pre-coding matrix is regarded as the beam ID) in the U-matrix, and feeds back the beam ID to the BTS; the UE uses the preferred beam and the capacity supported when interference from other beams exists (other beams and the preferred beams of the UE belong to the same pre-coding matrix). Afterward, the BTS selects the corresponding beam in the U-matrix according to the preferred beam fed back by the UE, sends the beam to the corresponding best UE (the preferred beam of the UE is directed to the best UE, and this UE supports higher capacity than other UEs with the same beam direction), and calculates out the capacity supported by the U-matrix. In this way, the BTS in the SDMA system can select the U-matrix of highest capacity as a sending matrix, and the best UE corresponding to the beam of the matrix serves as the sending UE. In this method, the whole U-matrix is selected as a sending matrix fixedly.

The foregoing solution shows that, in the limited-feedback SDMA technology, data is sent by the maximum number of concurrent UEs supported by multiple antennas of the BTS simultaneously. In order to optimize the sending performance, the concurrent data streams need to undergo power allocation similar to water injection. However, the BTS based on the limited-feedback SDMA technology lacks enough broadcast channel information, and the existing solution to sending data in an SDMA system generally supposes that the concurrent UEs send signals at equal power, which leads to loss of sending performance to some extent. Further, in a sparse SDMA system, when the user quantity is far less than the maximum number supported by multiple antennas of the BTS, if the pre-coding codebook that bears the data is sent by the maximum number of UEs supported by the multiple antennas of the BTS simultaneously, strong interference exists between the concurrent UEs that currently access the SDMA system, and the enhancement of the throughput performance of the SDMA system is rather limited.

SUMMARY OF THE INVENTION

Embodiments of the present invention provide a method for improving throughput performance of an SDMA system. Embodiments of the present invention provide a system for improving throughput performance of an SDMA system. Embodiments of the present invention provide an apparatus for improving throughput performance of an SDMA system. Technical solutions under the present invention may be implemented in the following ways.

A method for improving throughput performance of an SDMA system includes, by a BTS, receiving feedback information sent by a UE, where the feedback information includes an ID of a preferred beam of the UE in the pre-coding codebook, information related to a channel vector modulus value, and information about phase difference between a channel vector and the preferred beam of the UE, and using a set estimation algorithm to estimate sum throughputs supported by the current SDMA system in each sending mode according to the received feedback information and information about space correlation between multiple antennas of the BTS, selecting a maximum sum throughput among the estimated sum throughputs, and using the sending mode corresponding to this sum throughput to send data.

A system for improving throughput performance in an SDMA system includes a UE configured to send feedback information to a BTS, where the feedback information includes an ID of a preferred beam of the UE in the pre-coding codebook, information related to a channel vector modulus value, and information about phase difference between a channel vector and the preferred beam of the UE, and a BTS configured to use a set estimation algorithm to estimate sum throughputs supported by the current SDMA system in each sending mode according to the feedback information received from the UE and information about space correlation between multiple antennas of the BTS, select a maximum sum throughput among the estimated sum throughputs, and use the sending mode corresponding to this sum throughput to send data.

An apparatus for improving throughput performance in an SDMA system includes a feedback information receiving module configured to receive feedback information sent by a UE, a feedback information processing module configured to use a set estimation algorithm to estimate sum throughputs supported by the current SDMA system in each sending mode according to the received feedback information and information about space correlation between multiple antennas of the BTS, and a stream selecting module configured to select a maximum sum throughput among the estimated sum throughputs, and use the sending mode corresponding to this sum throughput to send data.

Through the method, system, and apparatus provided herein, the BTS of the SDMA system uses a set estimation algorithm to estimate sum throughputs supported by the current SDMA system in each sending mode according to the feedback information received from the UE and information about space correlation between multiple antennas of the BTS (the feedback information includes an ID of a preferred beam of the UE, information related to a channel vector modulus value, and information about phase difference between a channel vector and the preferred beam of the UE), selects the best sending mode which enables the SDMA system to obtain a maximum sum throughput, and sends the data to the UE according to the selected best sending mode as well as the beam quantity and the UE corresponding to this sending mode. In embodiments of the present invention, the UE generally does not need to feed back CSI, but equivalent estimation is performed through an estimation algorithm. Unlike the prior art, which determines the throughput supported by the SDMA system only according to the ID of the preferred beam fed back by the UE and uses a fixed matrix to send data, embodiments of the present invention select the matrix or sub-matrix adaptively, namely, select the number of streams sent concurrently according to the estimated best sending mode, thus improving the throughput of the SDMA system.

BRIEF DESCRIPTION OF THE DRAWINGS

FIG. 1 is a flowchart of a method for improving throughput performance in an SDMA system in an embodiment of the present invention;

FIG. 2 shows an SDMA system model constructed in an embodiment of the present invention;

FIG. 3 shows a system for improving throughput performance in an SDMA system in an embodiment of the present invention;

DETAILED DESCRIPTION OF ILLUSTRATIVE EMBODIMENTS

Figure 4:
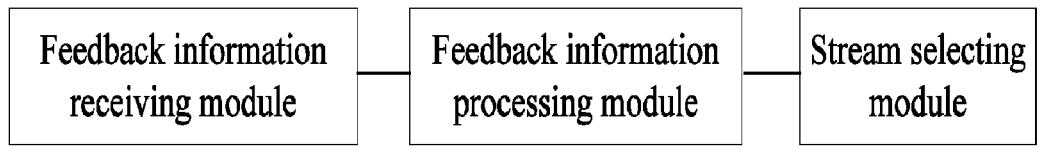
FIG. 4 shows an apparatus for improving throughput performance in an SDMA system in an embodiment of the present invention.

In order to make the technical solutions, objectives and merits of the present invention clearer, the following describes the embodiments of the present invention in more detail with reference to accompanying drawings.

In order to compensate for performance loss of a limited-feedback SDMA system effectively, the BTS in an embodiment of the present invention selects the number of concurrently sent streams adaptively (namely, adjusts the width of the matrix) at the time of designing the pre-coding and the user scheduling jointly according to feedback information from the UE. The feedback information includes the preferred beam ID of the matrix, information related to a channel vector modulus value, and information about phase difference between a channel vector and the preferred beam of the UE. In an SDMA system, the number of concurrent streams is selected adaptively, namely, through a rank adaptation technology, thus improving the system throughput significantly and approaching performance of best power water injection to some extent.

Specifically, embodiments of the present invention are based on a predefined pre-coding codebook. The information fed back by the UE is an ID of the preferred beam of the UE, information related to a channel vector modulus value, and information about phase difference between a channel vector and the preferred beam of the UE. Based on such feedback information and the information about space correlation between multiple antennas of the BTS, the BTS estimates the sum throughputs supported by the SDMA system in different sending modes according to a set estimation algorithm, and selects the best sending mode so that the SDMA system can achieve the maximum sum throughput. In this way, the BTS adaptively selects the best sending mode as well as the beam quantity and the UE corresponding to this sending mode, and sends the streams to the UE concurrently.

In an embodiment of the present invention, the pre-coding codebook is one or more U-matrixes. Each column in the U-matrix represents the beam. Currently, other matrixes may be used as the pre-coding codebook.

FIG. 1 is a flowchart of a method for improving throughput performance in an SDMA system in an embodiment of the present invention. The method includes the following steps.

In step 101, the BTS receives the following information sent by a UE: ID of a preferred beam of the UE in the pre-coding codebook, information related to a channel vector modulus value, and information about phase difference between a channel vector and the preferred beam of the UE.

Before this step, a model is constructed in the SDMA system. That is, the BTS constructs a data bearing matrix corresponding to multiple UEs, and sends data to multiple UEs at equal power. This matrix may be a random U-matrix, which is called a pre-coding codebook here.

In this step, the UE performs channel estimation to obtain an ID of a preferred beam in the matrix, information related to a channel vector modulus value, and information about phase difference between a channel vector and the preferred beam of the UE.

In this step, there are multiple UEs.

In step 102, the BTS uses a set estimation algorithm to estimate sum throughputs supported by the current SDMA system in each sending mode according to the feedback information sent by the UE in step 101 and information about space correlation between multiple antennas of the BTS, and selects the best sending mode so that the SDMA system can obtain the maximum sum throughput.

The estimation algorithm may be a maximum likelihood estimation algorithm. That is, the BTS estimates the CSI of the UE or its equivalent channel according to the feedback information sent by the UE in step 101 and the information about space correlation between multiple antennas of the BTS.

In step 103, the BTS determines the corresponding sending mode as well as the beam quantity and the UE corresponding to this sending mode according to the selected maximum sum throughput. The BTS sends the Data streams which are carried in the determined beam to the UE.

In this embodiment, the beams corresponding to the sent streams are orthonormalized with each other in order to avoid interference between the supported sent streams.

Below is an example of a method provided in this embodiment.

It is assumed that the SDMA system is a multi-user multi-antenna communication system, the BTS in the SDMA system serves U UEs simultaneously, and $M_t$ transmitting antennas are configured for the BTS, and a single antenna is configured for each UE. FIG. 2 shows an SDMA system model constructed in an embodiment of the present invention. In order to make full use of the space resources of multiple antennas of the BTS, the BTS selects K UEs for sending data concurrently. K can be selected adaptively according to the broadcast channel information received by the BTS from the UE, and $K \leq M_t$ is fulfilled. That is, K generally cannot be greater than the maximum number of concurrent streams supported by the multiple antennas of the BTS. It is assumed that the vector of the signals sent by the K selected UEs is $s=[s_1, \ldots, s_K]^T$, $E[|s_k|^2]=1$, $k=1, \ldots, K$ is fulfilled, and UE numbered k (UE k) sends signals according to the beam vector $W_k$. Therefore, the total transmitted signals of the BTS may be represented by:

$$\tilde{s} = \sqrt{E_s} \sum_{k=1}^{K} s_k w_k \qquad \text{Formula (1)}$$

$E_s$ represents power of the sent signal, supposing that all UEs send signals at equal power. In the SDMA system in this embodiment, the beam vector $W_k$ of each UE is selected from a column of a pre-coding matrix in the pre-coding codebook. It is constrained here that $W_k$ is orthonormalized, namely, the pre-coding of the SDMA system is a category of U-pre-coding. The equivalent baseband received signal of UE k may be represented by formula (2):

$$y_k = \sqrt{E_s} \sum_{i=1}^{K} h_k^T w_i s_i + v_k \qquad \text{Formula (2)}$$

In the above formula, $h_k$ represents a transient channel vector of UE k with normalized average power, $h_k \in \Box^{M_t \times 1}$ is fulfilled, and it is assumed that flat fading is obeyed; $V_k$ represents white Gaussian noise, and its single-side power spectrum density is $N_0$.

After UE k receives the signal of formula (2), UE k sends feedback information to the BTS. The BTS collects feedback information from all UEs, obtains the sum throughputs supported by the current SDMA system in all modes according to the set estimation algorithm, selects the maximum sum throughput, determines the sending mode corresponding to the maximum sum throughput, and sends data in this sending mode. In this embodiment, the UE that receives the signal of formula (2) not only feeds back the ID of the best beam vector, but also feeds back the modulus value of the channel vector and the phase difference between the channel vector and the best beam. Accordingly, the BTS can perform overall scheduling.

It is assumed that the pre-coding codebook is $F=\{F_1, \ldots, F_N\}$, and its codeword $F_i$ is a U-matrix whose order is $M_t$, namely, $F_i F_i^H = I_{M_t}$. It is assumed that $F_i = [f_1^{(i)}, \ldots, f_{M_t}^{(i)}]$, and each column $\{f_j^{(i)}\}$ in the U-matrix is regarded as a sent beam vector of the UE. According to the estimated channel state information $h_k$, UE k selects the best sent beam vector $q_k$ from the pre-coding codebook according to formula (3) first:

$$q_k = \arg\max_{w_j^{(i)}} |h_k^T f_j^{(i)}| \qquad \text{Formula (3)}$$

Moreover, the ID $p_k$ of the $q_k$ in the pre-coding codebook is fed back to the BTS through a low-speed feedback channel. The total number of sent beam vectors in the pre-coding codebook is $NM_t$. Therefore, the feedback of $p_k$ occupies $\log_2(NM_t)$ information bits.

In this embodiment, UE k needs to select the sent beam which matches the channel conditions of UE k to the utmost, and it is necessary to suppress the mutual interference between concurrent sending UEs sufficiently and make full use of diversity of multiple sending UEs. Therefore, UE k needs to feed back the modulus value $\rho_k=\|h_k\|$ of its channel, and the phase value $\cos(\theta_k)$ between its channel vector and the best beam, which is defined in formula (4):

$$\cos(\theta_k)=|h_k^T q_k|/\|h_k\|=|\tilde{h}_k^T q_k| \qquad \text{Formula (4)}$$

In this embodiment, the UE feeds back its channel vector, which increases several bits of feedback information. This feedback information may be sent to the BTS through a low-speed feedback channel.

In the prior art, as regards the pre-coding codebook $F=\{F_1, \ldots, F_N\}$, the limited-feedback SDMA technology generally stipulates that the BTS sends data through $M_t$ beams concurrently in the design optimization. That is, a U-matrix in the pre-coding codebook serves as a sending matrix except that certain beams in the matrix match no UE. By contrast, the method provided in an embodiment of the present invention stipulates that the number of beams sent concurrently is flexibly selectable in the range between 1 and $M_t$, and the number of finally sent streams needs to maximize the sum throughput. Meanwhile, the method herein stipulates that concurrent sent beams are orthonormalized with each other; a symbol $\{w_1, \ldots, w_K\}$ is used to indicate all concurrent sent streams, and the number of concurrent sent streams is K, which fulfills $1 \leq K \leq M_t$; the sending matrix $W=[w_1, \ldots, w_K]$ composed of the concurrent sent streams needs to be a codeword in the pre-coding codebook or a sub-matrix that includes K columns; each different w corresponds to a different sending mode, which is expressed as $W^{(i)}=[w_1^{(i)} \ldots w_{K_i}^{(i)}]$, where the superscript represents the ID of the sending mode. The dimension N of the pre-coding codebook and the number of transmitted antennas $M_t$ may have a maximum of $$M_p = N \sum_{k=1}^{M_t} \binom{M_t}{k}$$

different sending modes. For a specific sending mode $W^{(i)}$, $i=1, \ldots M_p$, if one of the concurrent sent streams is a preferred beam of certain UEs, the maximum sum throughput supported by this sending mode can be calculated according to the CSI fed back by the UE, namely:

$$T_i = \sum_{j=1}^{K_i} \log_2(1 + msinr_j^{(i)}) \quad \text{Formula (5)}$$

In the formula above, $msinr_j^{(i)}$ represents the maximum SINR supported by the sent beam numbered j under this mode, as expressed by:

$$msinr_j^{(i)} = \max_{1 \leq k \leq U, q_k = w_j^{(i)}} \left( \frac{E_s |h_k^T w_j^{(i)}|^2}{E_s \sum_{l=1, l \neq j}^{K_i} |h_k^T w_l^{(i)}|^2 + N_0} \right) = \quad \text{Formula (6)}$$

$$\max_{1 \leq k \leq U, q_k = w_j^{(i)}} \left( \frac{\rho_k^2 \cos^2(\theta_k)}{\sum_{l=1, l \neq j}^{K_i} |h_k^T w_l^{(i)}|^2 + 1/snr_k} \right)$$

In the formula above, $snr_k$ represents the transmitting SNR of UE k, namely, $snr_k = E_s/N_0$. In the method provided in this embodiment, the BTS is unable to obtain the UE CSI. Therefore, the value of $msinr_j^{(i)}$ in formula (6) is not precisely estimable but can be estimated through maximum-likelihood estimation according to limited feedback information. Formula (6) reveals that: For the codeword $F_n$ pointed to by UE k in the pre-coding codebook (namely, the best beam $q_k$ of this UE corresponding to $p_k$ is subsidiary to a column of $F_n$), if the equivalent channel vector $\tilde{h}_{k,e} = F_n^T h_k$ can be estimated out, the estimate value of the $msinr_j^{(i)}$ can be obtained because $h_k^T w_l^{(i)}$ is surely an element in $\tilde{h}_{k,e}$. As a way of generalization, the position of the beam (column vector) of the codeword $F_n$ is transposed in this embodiment, and therefore, $q_k$ is located in the first column of the matrix. After the transposition, the matrix is represented by F, and the equivalent channel is represented by $h_{k,e} = F^T h_k$.

In order to estimate the equivalent channel vector $h_{k,e}$, this embodiment makes full use of the statistic-related features of the channel, as defined in:

$$R_k = E[h_k h_k^H] \quad \text{Formula (7)}$$

$R_k$ represents space correlation between multiple antennas of the BTS. Its value depends on the factors such as antenna spacing, distribution of surrounding scatterers, and emergence angle. If no space correlation exists between antennas of the BTS, $R_k = I_{M_t}$ is fulfilled. However, in an actual SDMA system, multiple antennas are correlated with each other to some extent because the BTS generally lacks scatterers. Compared with the transient channel $h_k$ which changes with time, $R_k$ changes slowly. Therefore, the BTS can obtain the foregoing statistic information through feedback or through estimation based on upstream data.

Supposing that the channel $h_k$ takes on zero-mean-value complex Gaussian distribution, $h_{k,e}$ also takes on zero-mean-value complex Gaussian distribution. Its second-order statistic correlation is expressed as:

$$R_{k,e} = E[h_{k,e} h_{k,e}^H] = F^T R_k F \quad \text{Formula (8)}$$

Therefore, the probability density distribution function of $h_{k,e}$ may be expressed as:

$$f(h_{k,e}) = \frac{1}{\pi^{N_t} \det(R_{k,e})} \exp(-h_{k,e}^H R_{k,e}^{-1} h_{k,e}) \quad \text{Formula (9)}$$

A part of the feedback information reveals that $h_{k,e}$ further fulfills these constraint conditions: $h_{k,e}^H h_{k,e} = h_k^H h_k = \rho_k^2$; and $h_{e,1} = q_k^T h_k = \rho_k \cos(\theta_k)$. Here, $h_{e,1}$ represents the first element of $h_{k,e}$. Therefore, the maximum-likelihood estimation of $h_{k,e}$ may be expressed as the following constraint optimization formula:

$$\hat{h}_{k,e} = \underset{h_{k,e}}{\operatorname{argmax}}(f(h_{k,e})) \quad \text{Formula (10)}$$

$$\text{s.t.} \begin{cases} h_{e,1} = \rho_k \cos(\theta_k) \\ h_{k,e}^H h_{k,e} = \rho_k^2 \end{cases}$$

Formula (10) is equivalent to formula (11):

$$\hat{h}_{k,e} = \underset{h_{k,e}}{\operatorname{argmin}}(h_{k,e}^H R_{k,e}^{-1} h_{k,e}) \quad \text{Formula (11)}$$

$$\text{s.t.} \begin{cases} h_{e,1} = \rho_k \cos(\theta_k) \\ h_{k,e}^H h_{k,e} = \rho_k^2 \end{cases}$$

The Lagrange extreme value method may be used to deduce:

$$\tilde{h}_{k,e} = [\rho_k \cos(\theta_k) b^T]^T$$

$$b = -\rho_k \cos(\theta_k)(\Phi^T R_k^{-1} \Phi^* - \xi I)^{-1} \Phi^T R_k^{-1} q_k^* \quad \text{Formula (12)}$$

$\Phi$ represents a sub-matrix composed of column 2 to column $M_t$ of F, namely, $F = [q_k \ \Phi]$. The Lagrange $\xi$ multiplier is the minimum root of the following equation:

$$\sum_{i=1}^{M_t-1} \frac{|a_i|^2}{(\lambda_i - \xi)^2} = \rho_k^2 \frac{1-\cos^2(\theta_k)}{\cos^2(\theta_k)} \quad \text{Formula (13)}$$

In the formula above, $[a_1 \ldots a_{M_t-1}]^T = \Phi^T R_k^{-1} q_k^*$ and $\{\lambda_i\}$ represent the characteristic root of $\Phi^T R_k^{-1} \Phi^*$. Formula (13) is an interval convex function. Supposing that $\lambda_1$ represents the minimum characteristic root of the matrix $\Phi^T R_k^{-1} \Phi^*$, the minimum root of formula (13) surely belongs to interval $[-\infty, \lambda_1)$. It is easy to obtain the Lagrange multiplier $\xi$ through a numerical method.

According to the estimate value $\hat{h}_{k,e}$ of the equivalent channel, formula (5), and formula (6), the sum throughputs supported by all possible sending modes based on the pre-coding codebook can be calculated out. The BTS selects the sending mode which provides the maximum sum throughput to send concurrent streams, which is expressed as:

$$W^{(o)} = \underset{W^{(i)}}{\operatorname{argmax}} \left( \hat{T}_i(W^{(i)}) \right) \quad \text{Formula (14)}$$

The ID of $K_o$ scheduled UEs may be represented by:

$$k_l = \underset{1 \le k \le U, q_k = f_j^{(o)}}{\operatorname{argmax}} \left( \frac{\rho_k^2 \cos^2(\theta_k)}{\sum_{l=1, l \ne j}^{K_o} |est(h_k^T w_l^{(o)})|^2 + 1/snr_k} \right), \quad \text{Formula (15)}$$

$$l = 1, \ldots, K_o$$

In the formula above, $est(h_k^T w_l^{(o)})$ represents the estimate value of $h_k^T w_l^{(o)}$ obtained through equivalent channel estimation. Its value can be calculated out through $\hat{h}_{k,e}$. The ID of the sent beam preferred by the scheduled UE corresponds to each column in $W^{(o)}$.

However, the complexity of the calculation steps of the foregoing estimation method lies in summation of formula (13) and matrix inversion of formula (12). Because the relevant matrix $R_k$ changes slowly with time, the inversion of the matrix generally needs to be updated only at intervals. On the basis of known $R_k^{-1}$, parameter $\{a_i\}$ in formula (13) is decided by $\Phi^T R_k^{-1} q_k^*$ through matrix multiplication. Calculation of parameter $\{\lambda_i\}$ involves eigen decomposition for matrix $A \square \Phi^T R_k^{-1} \Phi^*$, which is generally as complex as calculating $O((M_t-1)^3)$. In fact, after completion of eigen decomposition for A, inversion of matrix $B = (A - \xi I)$ in formula (12) can be performed through simple multiplication according to the following formula, thus simplifying the calculation. The eigen decomposition of A is expressed as:

$$A = U_A D_A U_A^H \quad \text{Formula (16)}$$

$D_A = \operatorname{diag}(\lambda_1, \ldots, \lambda_{M_t-1})$ is fulfilled. Therefore:

$$B = U_A(D_A - \zeta I) U_A^H \quad \text{Formula (17)}$$

$$B^{-1} = U_A D_C U_A^H$$

$$D_C = \operatorname{diag}\left(\frac{1}{\lambda_1 - \xi}, \ldots, \frac{1}{\lambda_{M_t-1} - \xi}\right) \text{ is fulfilled.}$$

In this way, according to the feedback information from the UE (the feedback information includes the ID of the preferred beam fed back by the UE, information related to a channel vector modulus value, and information about phase difference between the channel vector and the preferred beam) and the information about space correlation between multiple antennas of the BTS, the BTS can use the set estimation algorithm to obtain the sending mode that supports the maximum sum throughput in the current SDMA system and obtain the number of sent streams supported by this module, construct the sending mode which provides the supported number of sent streams, and send the streams to the corresponding UE.

A system for improving throughput performance in an SDMA system is provided in an embodiment of the present invention. As shown in FIG. 3, the system includes a UE, configured to send feedback information to a BTS, where the feedback information includes an ID of a preferred beam of the UE in the pre-coding codebook, information related to a channel vector modulus value, and information about phase difference between a channel vector and the preferred beam of the UE, and a BTS, configured to use a set estimation algorithm to estimate sum throughputs supported by the current SDMA system in each sending mode according to feedback information received from the UE and information about space correlation between multiple antennas of the BTS, where the feedback information includes the ID of the preferred beam of the UE, the information related to the channel vector modulus value, and the information about phase difference between the channel vector and the preferred beam of the UE, select the best sending mode which enables the SDMA system to obtain a maximum sum throughput, and send data to the UE according to the selected best sending mode as well as the beam quantity and the UE corresponding to this sending mode.

In this embodiment, the UE includes a feedback module, which is configured to send feedback information to the BTS, where the feedback information includes the ID of the preferred beam of the UE in the pre-coding codebook, the information related to the channel vector modulus value, and the information about phase difference between the channel vector and the preferred beam of the UE.

In this embodiment, the BTS includes a feedback information receiving module configured to receive feedback information from the UE, where the feedback information includes an ID of a preferred beam of the UE, information related to a channel vector modulus value, and information about phase difference between a channel vector and the preferred beam of the UE, a feedback information processing module configured to: use a set estimation algorithm to estimate sum throughputs supported by the current SDMA system in each sending mode according to the feedback information received from the UE and information about space correlation between multiple antennas of the BTS, where the feedback information includes the ID of the preferred beam of the UE, the information related to the channel vector modulus value, and the information about phase difference between the channel vector and the preferred beam of the UE, select the best sending mode which enables the SDMA system to obtain a maximum sum throughput, and a stream selecting module, configured to send data to the UE according to the selected best sending mode as well as the beam quantity and the UE corresponding to this sending mode.

In this embodiment, the stream selecting module further includes a mode selecting module configured to determine the sending mode corresponding to the maximum sum throughput supported by the current SDMA system, and a mode-specific stream module, configured to determine the beam quantity and the UE corresponding to the determined sending mode, and send the data by carrying by carrying on the determined beams to the UE.

An apparatus for improving throughput performance in an SDMA system is provided in an embodiment of the present invention. As shown in FIG. 4, the apparatus includes a feedback information receiving module configured to receive feedback information from the UE, where the feedback information includes an ID of a preferred beam of the UE, information related to a channel vector modulus value, and information about phase difference between a channel vector and the preferred beam of the UE, a feedback information processing module configured to use a set estimation algorithm to estimate sum throughputs supported by the current SDMA system in each sending mode according to the feedback information received from the UE and information about space correlation between multiple antennas of the BTS, where the feedback information includes the ID of the preferred beam of the UE, the information related to the channel vector modulus value, and the information about phase difference between the channel vector and the preferred beam of the UE, select the best sending mode which enables the SDMA system to obtain a maximum sum throughput, and a stream selecting module, configured to send data to the UE according to the selected best sending mode as well as the beam quantity and the UE corresponding to this sending mode.

In this embodiment, the stream selecting module further includes a mode selecting module configured to determine the sending mode corresponding to the maximum sum throughput supported by the current SDMA system, and a mode-specific stream module, configured to determine the beam quantity and the UE corresponding to the determined sending mode, and send the data by carrying on the determined beams to the UE.

The method, system, and apparatus provided in embodiments of the present invention can improve the throughput performance of an SDMA system, which is illustrated by emulation results below.

It is assumed that the channel of the SDMA system is a flat fading channel, and keeps unchanged within a UE scheduling period, but changes independently between different scheduling periods. Four BTSs are configured for the BTS, and a single antenna is configured for every UE. The channels have the same average power. The space correlation matrix $R_k$ between multiple antennas of the BTS is simply expressed as:

$$R_k = \begin{bmatrix} 1 & \rho & \cdots & \rho^{M_t} \\ \rho^* & 1 & & \\ \vdots & & \ddots & \\ (\rho^*)^{M_t} & & & 1 \end{bmatrix} \quad \text{Formula (18)}$$

In the emulation, the codebook is an SDMA codebook based on the IEEE802.20 protocol.

Figure 5:
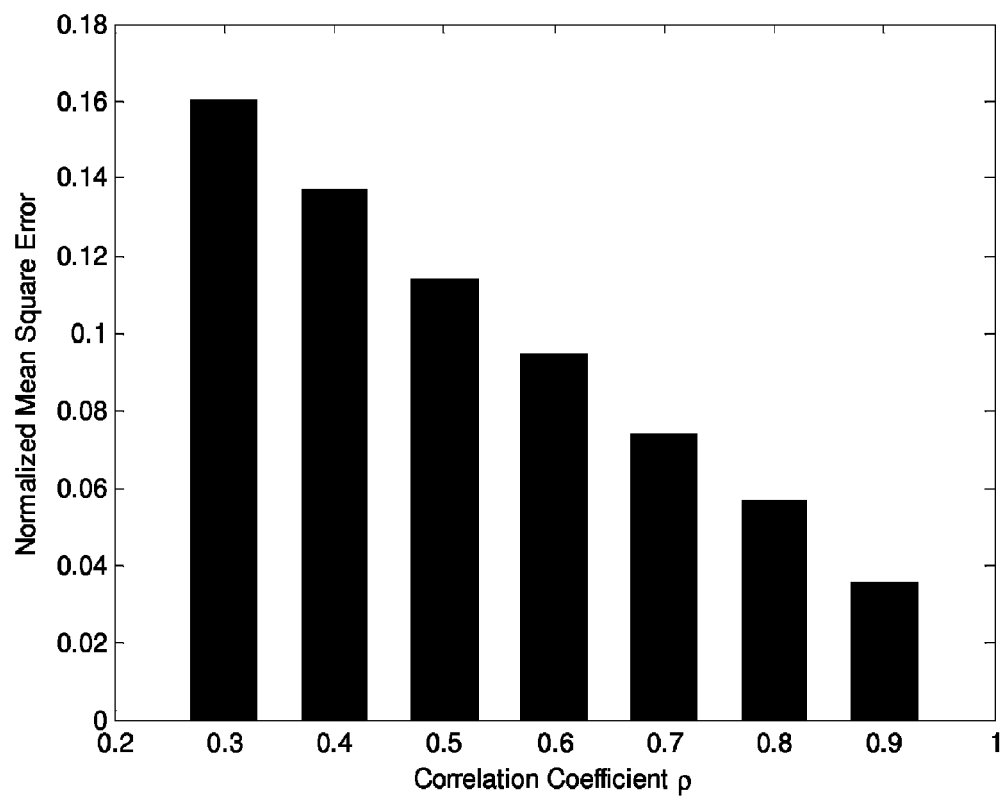
FIG. 5 shows a trend of an estimated NMSE of an equivalent channel which changes with a relevant coefficient $\rho$ between neighboring transmitting antennas in an embodiment of the present invention.

When the BTS uses the limited feedback information to estimate equivalent channel matrix, the space correlation matrix $R_k$ on the channel transmitting side needs to be applied. Therefore, the impact caused by $R_k$ onto channel estimation performance is surveyed in an embodiment of the present invention. FIG. 5 shows a trend of an estimated NMSE of an equivalent channel which changes with a relevant coefficient $\rho$ between neighboring transmitting antennas in an embodiment of the present invention. The NMSE is defined as:

$$nmse \square E\left[\frac{(|\hat{h}_{k,e}| - |h_{k,e}|)^2}{|h_{k,e}|^2}\right] \quad \text{Formula (19)}$$

As shown in FIG. 5, the NMSE decreases quasi-linearly with increase of $\rho$, indicating that the channel estimation performance is closely related to the space correlation between the transmitting antennas. The higher the space correlation is, the better the estimation performance will be.

Figure 6:
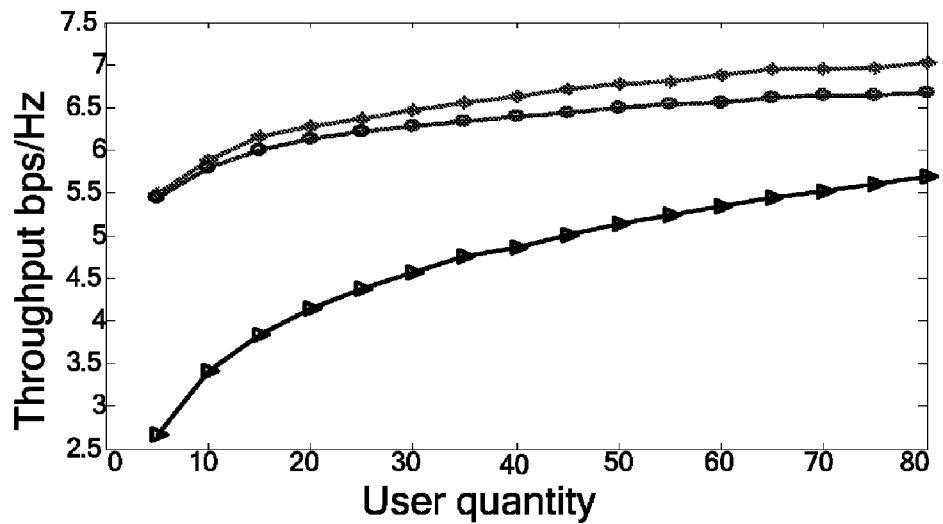
FIG. 6 shows throughput performance of an SDMA system when Signal-to-Noise Ratio (SNR) is 10 dB and the relevant coefficient $\rho$ is 0.8 in an embodiment of the present invention.
Figure 7:
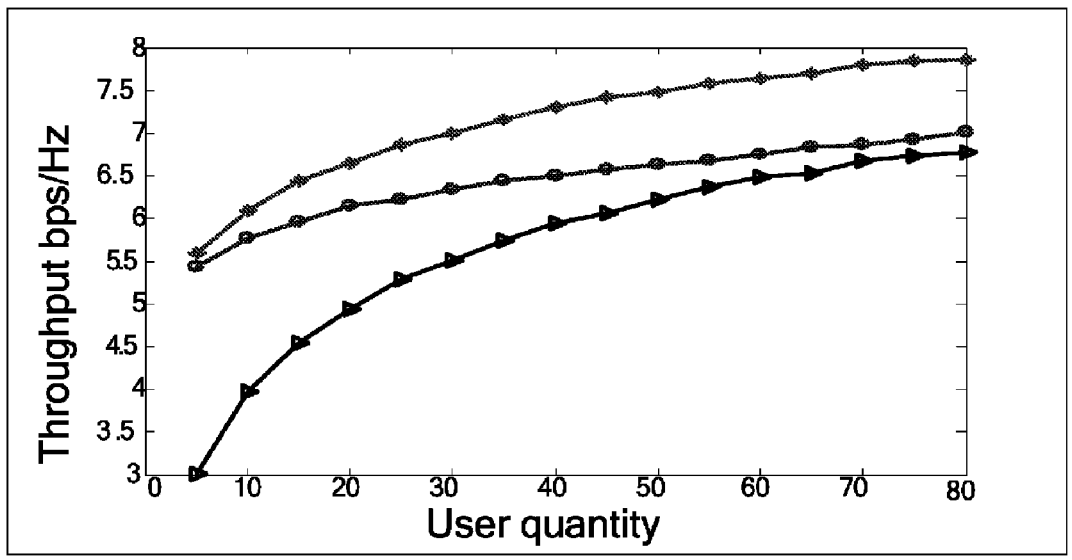
FIG. 7 shows throughput performance of an SDMA system when SNR is 10 dB and the relevant coefficient $\rho$ is 0.6 in an embodiment of the present invention.
Figure 8:
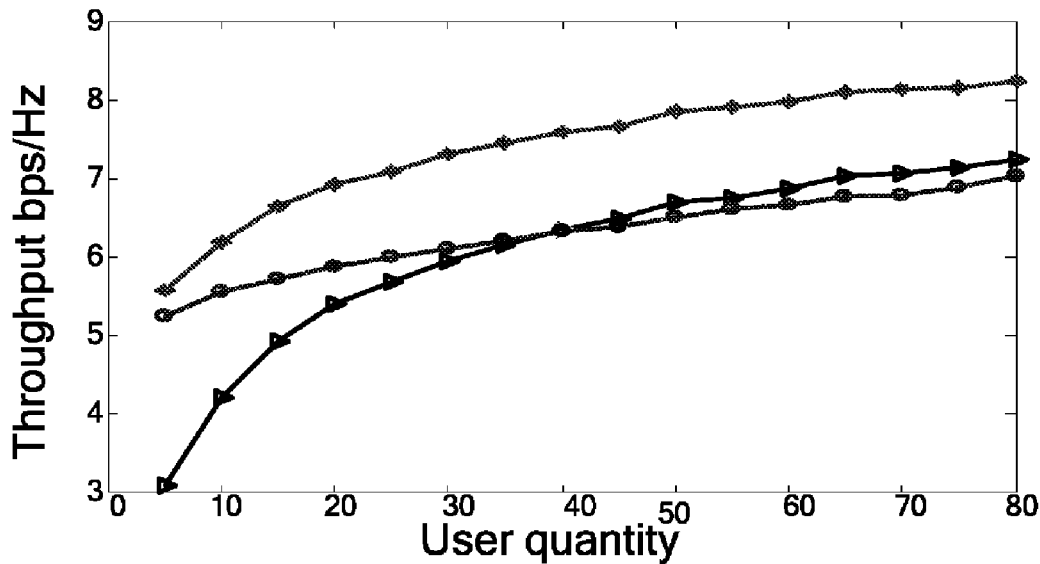
FIG. 8 shows throughput performance of an SDMA system when SNR is 10 dB and the relevant coefficient $\rho$ is 0.4 in an embodiment of the present invention.
Figure 9:
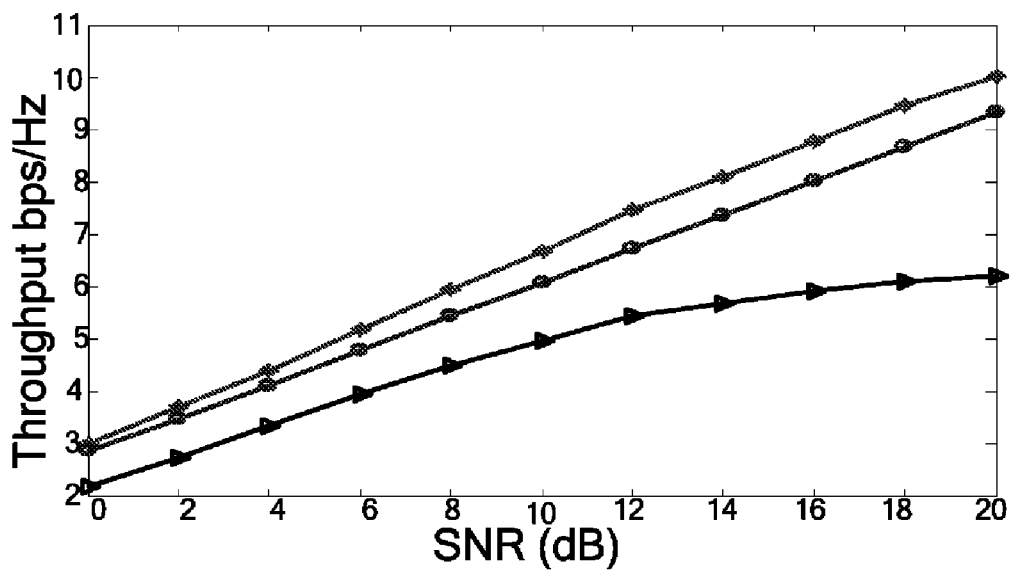
FIG. 9 shows the SDMA system throughput which increases with SNR when the relevant coefficient $\rho$ is 0.4 and the user quantity is 20 in an embodiment of the present invention.

FIG. 6-FIG. 9 are graphs showing improved throughput performance of an SDMA system adaptively in different channel environments based on a space correlation matrix $R_k$ in formula (18) and a relevant coefficient $\rho$ in formula (19). FIG. 6 shows throughput performance of an SDMA system when Signal-to-Noise Ratio (SNR) is 10 dB and the relevant coefficient $\rho$ is 0.8 in an embodiment of the present invention. FIG. 7 shows throughput performance of an SDMA system when SNR is 10 dB and the relevant coefficient $\rho$ is 0.6 in an embodiment of the present invention. FIG. 8 shows throughput performance of an SDMA system when SNR is 10 dB and the relevant coefficient $\rho$ is 0.4 in an embodiment of the present invention. FIG. 9 shows the SDMA system throughput which increases with SNR when the relevant coefficient $\rho$ is 0.4 and the user quantity is 20 in an embodiment of the present invention. In FIG. 6-FIG. 9, the curve formed by the solid diamonds generally marks the ideal best throughput of the SDMA system, the curve formed by the hollow cylinders generally marks the maximum sum throughput of the SDMA system calculated out according to the method provided in an embodiment of the present invention, and the hollow triangles generally marks the throughput of an SDMA system based on a pre-coding codebook in the prior art.

In FIG. 6-FIG. 9, for the purpose of comparison, the performance of an adaptive SDMA system that allows for only the existing 4-beam sending mode is illustrated (namely, MISO-SDMA solution in the IEEE802.20) (marked by the hollow triangles in the figure), and the performance of an ideal adaptive SDMA system is illustrated which supposes that no equivalent channel estimation error exists (marked by the solid diamonds in the figure). It is thus evident that, in a sparse network, the adaptive SDMA solution put forward herein is much better than the IEEE802.20 MISO-SDMA solution with respect to throughput performance. If the space correlation between antennas is higher, the performance advantages of the technical solutions under the present invention are more evident, and the performance is closer to the performance of an ideal adaptive SDMA system. With an increase of users, the adaptive SDMA disclosed herein provides less performance advantages as against the IEEE802.20 MISO-SDMA, and is even inferior to the latter in the case of low space correlation between antennas. That is because in the IEEE802.20 MISO-SDMA, with increase of users, the interference between scheduled concurrent users decreases. In the case of low space correlation between antennas, the equivalent channel estimation error in the solution under the present invention is relatively great. FIG. 9 shows that the solution under the present invention can avoid performance platform because the mutual interference between concurrent users is controlled effectively.

The method, system, and apparatus provided herein can not only integrate the MIMO transmission technology with multi-UE scheduling technology, but also select the best number of concurrent sent streams (also known as beams) adaptively. A pre-coding codebook is applied herein to reduce feedback quantity from the UE. The UE needs to feed back not only the ID of the best beam in the pre-coding codebook and the information related to the channel vector modulus value, but also information about phase difference between the channel vector and the preferred beam of the UE. Therefore, through constraint maximum-likelihood estimation, the BTS can schedule the UE characterized by good channel conditions, and adaptively select the best concurrent user sending mode and the concurrent sent streams under this sending mode at the same time. Embodiments of the present invention make full use of the statistic information of the multi-antenna channel to improve precision of likelihood estimation. Emulation results show that in a sparse network of the SDMA system, the embodiments of the present invention provide evident performance advantages as against the existing SDMA solution in the prior art.

Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for improving throughput performance of a Space Division Multiple Access (SDMA) system, the method comprising:
    receiving, by a Base Transceiver Station (BTS), feedback information sent by a User Equipment (UE), wherein the feedback information comprises an identifier (ID) of a preferred beam of the UE in a pre-coding codebook, information related to a channel vector modulus value, and information about phase difference between a channel vector and the preferred beam of the UE;
    using, by the BTS, a set estimation algorithm to estimate sum throughputs supported by the SDMA system in each sending mode according to the received feedback information and information about space correlation between multiple antennas of the BTS; and
    selecting, by the BTS, a maximum sum throughput among the estimated sum throughputs, and using the sending mode corresponding to the maximum sum throughput to send data.

2. The method of claim 1, before using the sending mode corresponding to the maximum sum throughput to send data, the method further comprising:
    determining a beam quantity and the UE under the sending mode; and
    wherein the using the sending mode corresponding to the maximum sum throughput to send data comprises sending the data by carrying the data on the beams of the determined beam quantity to the UE.

3. The method of claim 1, wherein:
    the pre-coding codebook is one or more U-matrixes, and each column in the U-matrix represents a beam.

4. The method of claim 1, wherein the estimating of the sum throughputs supported by the SDMA system in each sending mode comprises:
    calculating the sum throughput $$T_i = \sum_{j=1}^{K_i} \log_2(1 + msinr_j^{(i)})$$

supported in each sending mode, wherein: K is a number of UEs, j is the ID of the beam selected by the UE, and $msinr_j^{(i)}$ represents the maximum Signal-Interference-Noise Ratio (SINR) supported by sent beam numbered j under the sending mode; and the maximum SINR supported by the sent beam numbered j under the sending mode is $$msinr_j^{(i)} = \max_{1 \le k \le U, q_k = w_j^{(i)}} \left( \frac{E_s |h_k^T w_j^{(i)}|^2}{E_s \sum_{l=1, l \ne j}^{K_i} |h_k^T w_l^{(i)}|^2 + N_0} \right) =$$

$$\max_{1 \le k \le U, q_k = w_j^{(i)}} \left( \frac{\rho_k^2 \cos^2(\theta_k)}{\sum_{l=1, l \ne j}^{K_i} |h_k^T w_l^{(i)}|^2 + 1/snr_k} \right),$$

wherein $snr_k$ represents transmitting Signal-to-Noise Ratio (SNR) of the kth UE.

5. The method of claim 4, wherein, when calculating $msinr_j^{(i)}$ estimating the channel vector or an equivalent channel of all UEs according to the feedback information, the set estimation algorithm is a maximum likelihood estimation algorithm, and the method comprises:
    using an estimate value $\hat{h}_{k,e}$ of the equivalent channel $\tilde{h}_{k,e} = F_n^T h_k$ as information required for calculating $msinr_j^{(i)}$, wherein $F_n$ is a U-matrix in the pre-coding codebook and $h_k$ is the channel vector of the kth; and $$\tilde{h}_{k,e} = [\rho_k \cos(\theta_k) b^T]^T$$

$$b = -\rho_k \cos(\theta_k)(\Phi^T R_k^{-1} \Phi^* - \xi I)^{-1} \Phi^T R_k^{-1} q_k^*$$

wherein $R_k$ is the information about the space correlation between multiple antennas of the BTS, and the value of $R_k$ is determined according to antenna spacing, distribution of surrounding scatterers, and emergence angle; $\Phi$ represents a sub-matrix composed of column 2 to column $M_t$ of F; and Lagrange multiplier $\xi$ fulfills the following equation:

$$\sum_{i=1}^{M_t-1} \frac{|a_i|^2}{(\lambda_i - \xi)^2} = \rho_k^2 \frac{1 - \cos^2(\theta_k)}{\cos^2(\theta_k)},$$

wherein $[a_1 \ldots a_{M_t-1}]^T = \Phi^T R_k^{-1} q_k^*$ and $\{\lambda_i\}$ represent the characteristic root of $\Phi^T R_k^{-1} \Phi^*$.

6. A system for improving throughput performance in a Space Division Multiple Access (SDMA) system, the system comprising a Base Transceiver Station (BTS);
    wherein the BTS is configured to receive feedback information from at least one User Equipment (UE), wherein the feedback information comprises an identifier (ID) of a preferred beam of the at least one UE in a pre-coding codebook, information related to a channel vector modulus value, and information about phase difference between a channel vector and the preferred beam of the at least one UE;
    wherein the BTS is configured to use a set estimation algorithm to estimate sum throughputs supported by the SDMA system in each sending mode according to feedback information sent by the at least one UE and information about space correlation between multiple antennas of the BTS, select a maximum sum throughput among the estimated sum throughputs, and use the sending mode corresponding to the maximum sum throughput to send data; and wherein the feedback information comprises an identifier (ID) of a preferred beam of the at least one UE in a pre-coding codebook, information related to a channel vector modulus value, and information about phase difference between a channel vector and the preferred beam of the at least one UE.

7. The system of claim 6, wherein the BTS comprises:
a feedback information receiving module, configured to receive the feedback information sent by the at least one UE;
a feedback information processing module, configured to use the set estimation algorithm to estimate the sum throughputs supported by the SDMA system in each sending mode according to the received feedback information and the information about space correlation between multiple antennas of the BTS; and
a stream selecting module, configured to select the maximum sum throughput among the estimated sum throughputs and use the sending mode corresponding to the maximum sum throughput to send data.

8. An apparatus for improving throughput performance in a Space Division Multiple Access (SDMA) system, the apparatus comprising:
a Base Transceiver Station (BTS), the BTS comprising:
a feedback information receiving module configured to receive feedback information sent by at least one User Equipment (UE);
a feedback information processing module configured to use a set estimation algorithm to estimate sum throughputs supported by a current SDMA system in each sending mode according to the received feedback information and information about space correlation between multiple antennas of the BTS; and
a stream selecting module configured to select a maximum sum throughput among the estimated sum throughputs determine a quantity of selectable beams according to the maximum sum throughput, and use the sending mode corresponding to the maximum sum throughput to send data by carrying the data on the determined quantity of selectable beams.

9. The apparatus of claim 8, wherein the determined quantity of selectable beams are flexibly selectable between 1 and M, where M is greater than 1.

10. The apparatus of claim 8, wherein the feedback information comprises an identifier (ID) of a preferred beam of the at least one UE in a pre-coding codebook, information related to a channel vector modulus value, and information about phase difference between a channel vector and the preferred beam of the at least one UE.

11. The system of claim 6, wherein the BTS is further configured to:
determine a quantity of selectable beams corresponding to the maximum sum throughput; and
send the data on the determined quantity of selectable number of beams.

12. The system of claim 8, wherein the feedback information receiving module configured to receive feedback information sent by every UE.

13. The system of claim 6, wherein the BTS is further configured to receive feedback information from every UE.

14. The method of claim 1, wherein receiving, by a Base Transceiver Station (BTS), feedback information sent by a UE further comprises receiving feedback information sent by every UE.

* * * * *